(12) United States Patent
Wang et al.

(10) Patent No.: US 11,579,742 B2
(45) Date of Patent: Feb. 14, 2023

(54) INFRARED TOUCH FRAME, DISPLAY DEVICE AND DISPLAY APPARATUS

(71) Applicant: BOE Technology Group Co., Ltd., Beijing (CN)

(72) Inventors: Zifeng Wang, Beijing (CN); Yan Ren, Beijing (CN); Yunpeng Wu, Beijing (CN); Wenbin Wang, Beijing (CN); Junmin Sun, Beijing (CN); Lei Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/588,304

(22) Filed: Jan. 30, 2022

(65) Prior Publication Data

US 2022/0291766 A1    Sep. 15, 2022

(30) Foreign Application Priority Data

Mar. 12, 2021 (CN) .......................... 202120531087.0

(51) Int. Cl.
*G06F 3/046* (2006.01)
*G06F 3/041* (2006.01)

(52) U.S. Cl.
CPC ............ *G06F 3/046* (2013.01); *G06F 3/0412* (2013.01)

(58) Field of Classification Search
CPC ................................ G06F 3/046; G06F 3/0412
See application file for complete search history.

(56) References Cited

U.S. PATENT DOCUMENTS

| 2009/0141003 | A1* | 6/2009 | Xuan | G06F 3/0421 |
| | | | | 345/175 |
| 2015/0109255 | A1* | 4/2015 | Lien | G06F 3/0421 |
| | | | | 345/175 |

* cited by examiner

*Primary Examiner* — Lisa S Landis
(74) *Attorney, Agent, or Firm* — IPro, PLLC

(57) ABSTRACT

The present disclosure provides a frame, a display device and a display apparatus. The frame includes at least two frame assemblies. The frame assemblies in different directions are spliced through an adapter, an infrared lamp strip is installed on the frame assembly, the adapter is provided with a bunching member, and a connection line for the infrared lamp strip is bunched around the bunching member when the frame assemblies in different directions are spliced.

12 Claims, 5 Drawing Sheets

INFRARED TOUCH FRAME, DISPLAY DEVICE AND DISPLAY APPARATUS

CROSS-REFERENCE TO RELATED APPLICATION

This application claims a priority of the Chinese patent application No. 202120531087.0 filed on Mar. 12, 2021, which is incorporated herein by reference in its entirety.

TECHNICAL FIELD

The present disclosure relates to the field of infrared touch technology, in particular to an infrared touch frame, a display device and a display apparatus.

BACKGROUND

With the development of the display technology, a touch technology has been widely used in many commercial display products, such as electronic conference whiteboards. Due to a low cost and an unlimited size, an infrared touch screen has become a mainstream product in the touch field. Especially for oversized touch products, the infrared touch screen is a first choice.

However, for the oversized infrared touch products, there is an urgent need to provide a scheme for assembling a frame and combining the frame with an infrared touch display module.

SUMMARY

An object of the present disclosure is to provide an infrared touch frame, a display device and a display apparatus, so as to improve the reliability of the oversized infrared touch product as a whole.

In a first aspect, the present disclosure provides in some embodiments a frame, including at least two frame assemblies. The frame assemblies in different directions are spliced through an adapter, an infrared lamp strip is installed on the frame assembly, the adapter is provided with a bunching member, a connection line for the infrared lamp strip is bunched around the bunching member when the frame assemblies in different directions are spliced, and the bunching member is of a column-like structure.

In a possible embodiment of the present disclosure, the adapter includes a first connection member and a second connection member coupled to the first connection member, each of the first connection member and the second connection member is provided with one bunching member, and the connection line for the infrared lamp strip is bunched around the two bunching members when the frame assemblies in different directions are spliced.

In a possible embodiment of the present disclosure, one bunching member is arranged at a joint between the first connection member and the second connection member, and the connection line for the infrared lamp strip is bunched around the three bunching members when the frame assemblies in different directions are spliced.

In a possible embodiment of the present disclosure, the bunching member is a pin.

In a possible embodiment of the present disclosure, the frame assembly is provided with a groove for installing the infrared lamp strip and a first cavity for splicing the frame assemblies. The groove is arranged above the first cavity in a thickness direction of the frame assembly, with an end surface of the frame assembly in contact with a bottom cover as a bottom surface.

In a possible embodiment of the present disclosure, the two frame assemblies in different directions are spliced through inserting the first connection member and the second connection member into the first cavities of the two frame assemblies respectively.

In a possible embodiment of the present disclosure, each frame assembly is further provided with a second cavity for receiving the connection line.

In a possible embodiment of the present disclosure, the first cavity is in communication with the second cavity at a side of the frame assembly where the first connection member or the second connection member is inserted.

In another aspect, the present disclosure provides in some embodiments a display device, including: the above-mentioned frame; an infrared touch display module; and a bottom cover for packaging the frame and the infrared touch display module.

In a possible embodiment of the present disclosure, there is a plurality of infrared touch display modules spliced together.

In yet another aspect, the present disclosure provides in some embodiments a display apparatus including the above-mentioned display device.

In a possible embodiment of the present disclosure, the display apparatus is an electronic whiteboard or a smart interactive tablet.

The present disclosure at least has the following beneficial effects.

According to the frame, the display device and the display apparatus in the embodiments of the present disclosure, through splicing the frame assemblies of the frame, it is able to meet the installation requirement on the oversized infrared touch product. In addition, through optimizing a splicing operation at each corner of the frame, it is able to facilitate the assembling. Furthermore, through the bunching member at the corner, it is able to reduce a risk caused during the installation, and further facilitate the assembling.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 3b is a sectional view of the frame along a direction B in FIG. 3a;

Figure 1:
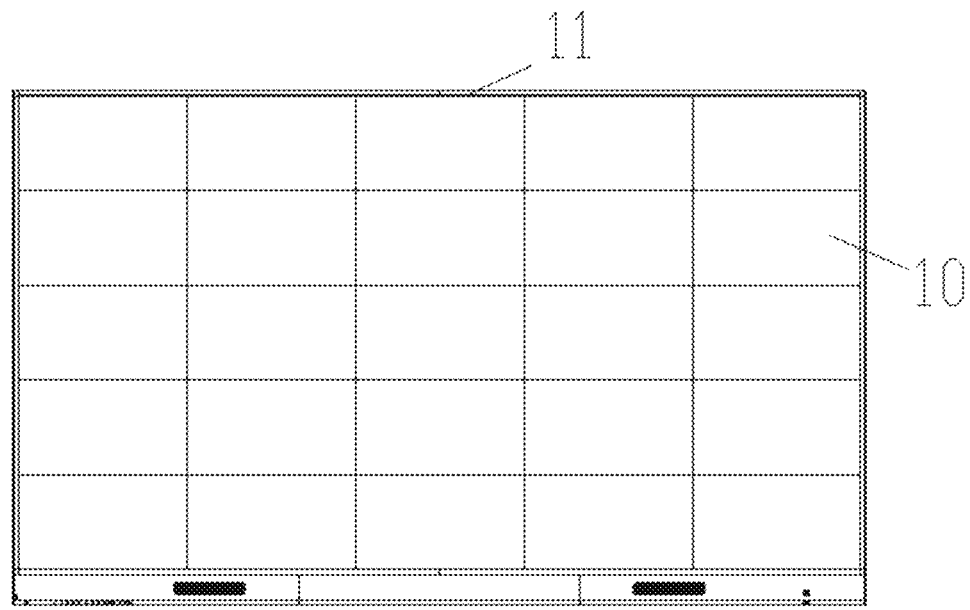
FIG. 1 is a schematic view of a conventional oversized display device.

REFERENCE SIGN LIST 10 infrared touch display module
11 frame
111 frame assembly
112 second cavity
113 first cavity
114 groove
115 infrared frame
116 outer frame
12 infrared lamp strip
121 filter
122 infrared lamp
13 connection line
14 bottom cover
15 adapter,
151 first connection member
152 second connection member
153 bunching member.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure. Generally, the assemblies in the drawings may be arranged and designed in different ways. Based on these embodiments, a person skilled in the art may, without any creative effort, obtain the other embodiments, which also fall within the scope of the present disclosure.

FIG. 1 shows an oversized display device. The oversized display device may be a 110-inch Liquid Crystal Display (LCD) display device or an oversized Light-Emitting Diode (LED) (such as 135-inch) spliced display device and the like. When the oversized display device is used in some application scenarios (such as conference hall), especially for the LED spliced display product, an interactive frame is required. Theoretically, the size of the display device may be infinitely large through splicing, but due to a constraint on a processing size, a segmented frame may be adopted merely. As shown in FIG. 1, for an independent product with spliced infrared touch display modules 10 (such as LED modules), it needs to be secured or protected by a frame 11. It is impossible to provide an infinitely long frame 11, so the frame 11 may be formed in one or more segments in accordance with the size of the display product and a manufacturing process of the frame. It is relatively easy to splice two frame assemblies in a same direction, e.g., through locking or riveting, while ensuring the appearance and accuracy. However, due to an assembly tolerance, it is difficult to accurately splice the frame assemblies at a corner. The more the segments, the more difficult to control the accuracy.

Figure 2:
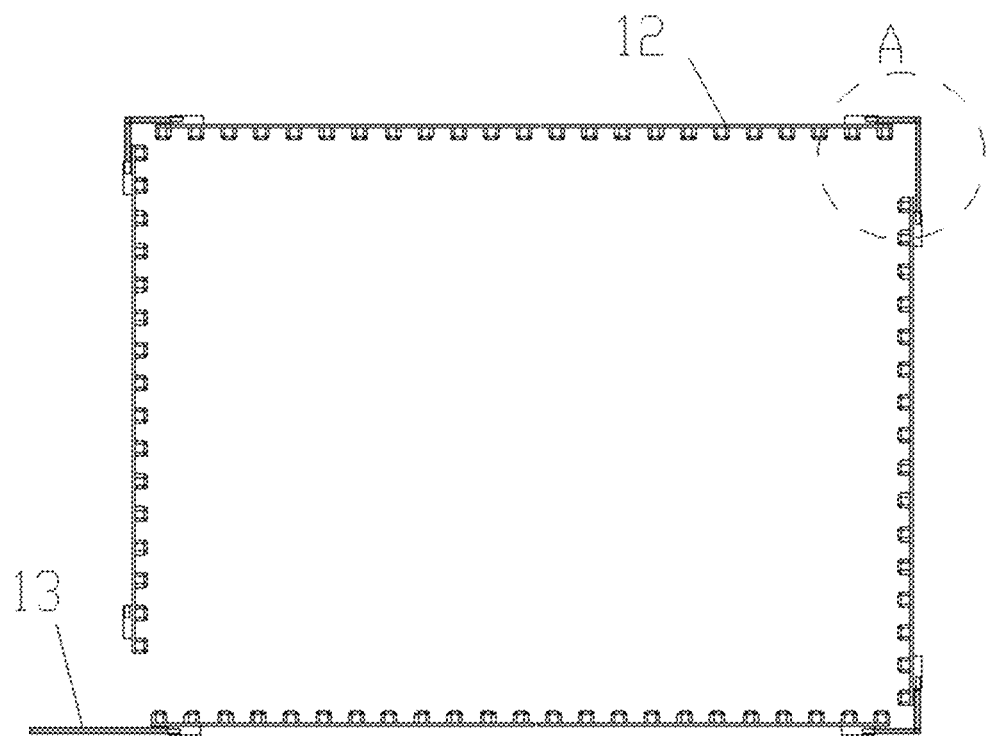
FIG. 2 is a schematic view of the connection of infrared lamp strips in the related art.

In addition, for the connection of the infrared lamp strips of the infrared touch product, as shown in FIG. 2, the infrared lamp strips are installed on four sides of the frame 11, i.e., upper and lower sides opposite to each other, and left and right sides opposite to each other. The infrared lamp strip on one side emits an infrared signal and the infrared lamp strip on other side receives the infrared signal. During the installation, the infrared lamp strips 12 enter the frame 11 from one end and then are coupled in sequence. Similarly, due to the restrain on the manufacturing process, a length of each infrared lamp strip 12 is also limited, so it needs to be divided into multiple segments. It is relatively easy to couple the infrared lamp strips 12 in a same direction (at a same side of the frame 11) to each other, but it is difficult to couple the infrared lamp strips 12 in different directions, especially at two sides perpendicular to each other. In addition, in order to meet requirements on the appearance of the oversized infrared touch product, the coupling between the infrared lamp strips 12 at a corner A is highly demanded. Especially, a connection line 13 between the infrared lamp strips 12 is actually not provided with a just right length at the corner A, and usually it is provided with a larger length to facilitate the assembling. During the assembling, it is also necessary to handle the connection line 13, leading to an increased difficulty in assembling the frame 11. An object of the present disclosure is to provide a frame, a display device and a display apparatus, so as to meet the installation requirement on the oversized infrared touch product through splicing the frame assemblies of the frame, and optimize a splicing operation at each corner of the frame, thereby to facilitate the assembling.

First Embodiment

Figure 3A:
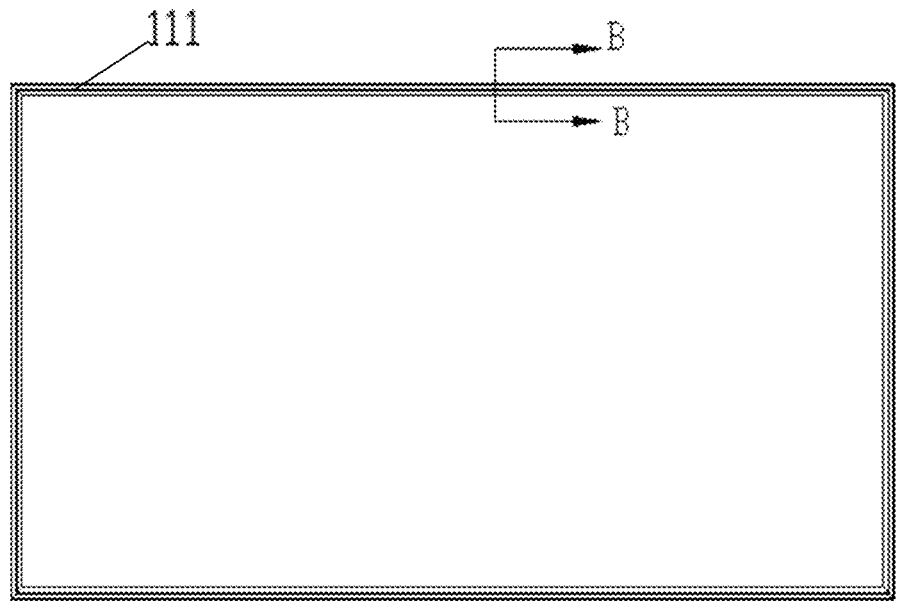
FIG. 3a is a schematic view showing a frame according to one embodiment of the present disclosure.

The present disclosure provides in this embodiment a frame which, as shown in FIG. 3a, includes at least two frame assemblies 111.

It should be appreciated that, the larger the size of the infrared touch product and the larger the size of the frame 11, the more the frame assemblies 111 (both in lateral and longitudinal directions). When the infrared touch product is not oversized (for example, the size of the LCD infrared touch product is less than 86 inches, and the size of the LED infrared touch product is less than 135 inches), the frame 11 includes four frame assemblies 111.

Figure 3B:
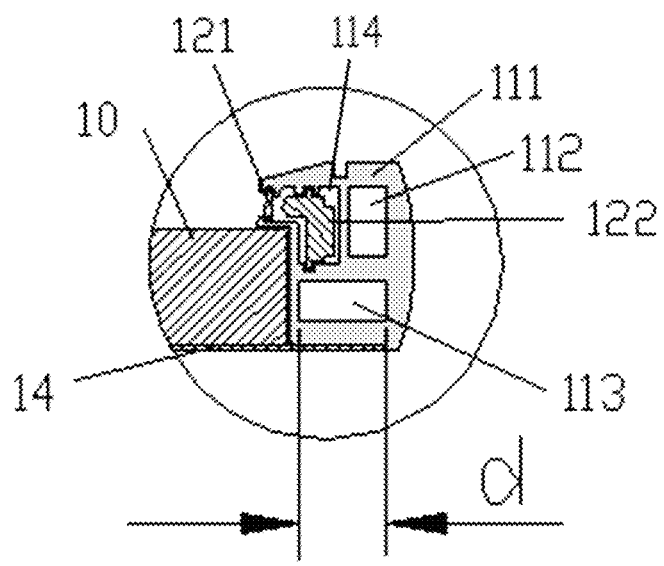
Figure 3C:
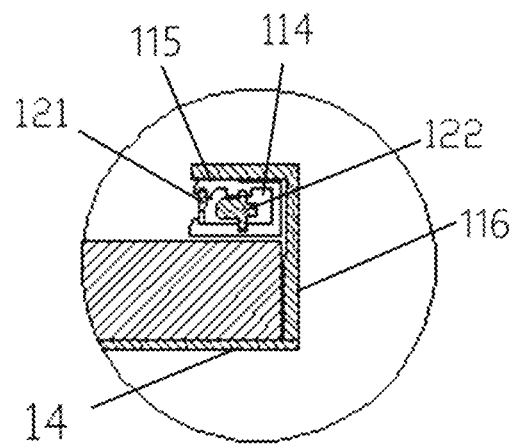
FIG. 3c is a sectional view of the frame along the direction B in the related art.

FIG. 3b and FIG. 3c show two sectional structures of the frame along a direction B, where FIG. 3b shows the sectional structure of the frame assembly 111 in the embodiments of the present disclosure and the FIG. 3c shows the sectional structure of the frame assembly 111 in the related art. As shown in FIG. 3c, in the conventional frame, an infrared frame 115 and an outer frame 116 are each of a split-type structure, which are suitable for small and medium-sized infrared touch products. In the small and medium-sized products, the infrared frame 115 may be an integral piece and placed on an infrared touch display module 10, and then all components are packaged through the outer frame 116 and a bottom cover 14. For the oversized infrared touch product, either the infrared lamp strip 12 or the frame 11 may not be formed through one step, so it is necessary to divide it into segments for the assembling. When the size of the infrared touch product with the structure in FIG. 3c increases, it is difficult to assemble and transport, so it is necessary to minimize the assembling steps as possible. As shown in FIG. 3b, the outer frame 116 and the infrared frame 115 are formed integrally, that is, the frame assembly 111. After the infrared lamp strips 12 have been installed, it is merely necessary to package the infrared touch display module 10 through the frame assembly 111, so it is able to facilitate the assembling, and simplify the product design in a combined manner.

Figure 4:
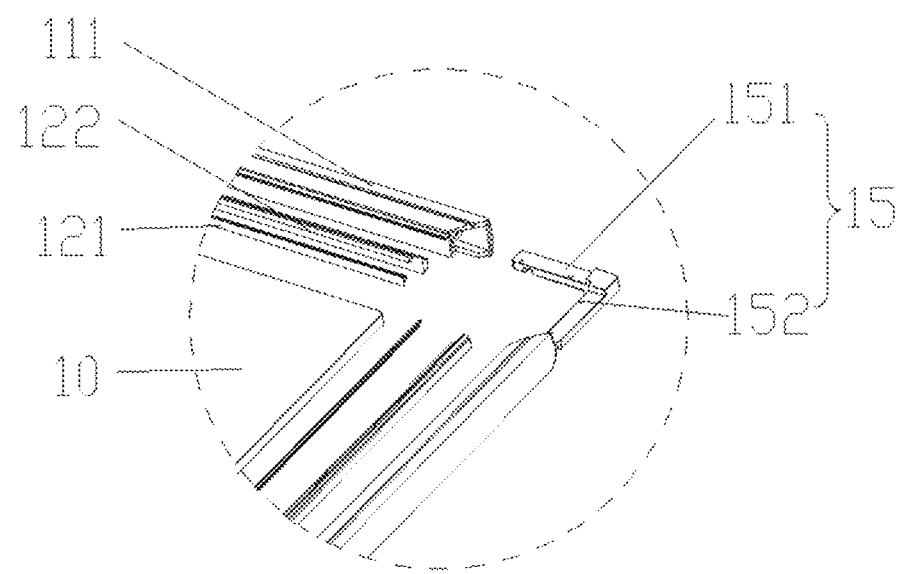
FIG. 4 is a schematic view of the splicing between frame assemblies according to one embodiment of the present disclosure.

FIG. 4 is a schematic view showing the splicing between frame assemblies in different directions. As shown in FIG. 4, the frame assemblies 111 in different directions are spliced through an adapter 15. The infrared lamp strip 12 is installed on the frame assembly 111, the adapter 15 is provided with a bunching member 153, the connection line 13 for the infrared lamp strip 12 is bunched around the bunching member 143 when the frame assemblies 111 in different directions are spliced, and the bunching member 153 is of a column-like structure. In a possible embodiment of the present disclosure, the adapter 15 includes a first connection member 151 and a second connection member 152 coupled to the first connection member 151. When two frame assemblies 111 in different directions are spliced, the first connection member 151 and the second connection member 152 are inserted into the two frame assemblies 111 in different directions respectively, so as to splice the two frame assemblies 111 at an angle of 45°.

In some cases, as shown in FIG. 3b, the frame assembly 111 is an integral piece, and it is provided with a groove 114 for installing the infrared lamp strip 12 and a first cavity 113 for splicing the frame assemblies 111. It should be appreciated that, the first cavity 113 may be used for splicing not only the two frame assemblies 111 in different directions but also the two frame assemblies 111 in a same direction. The infrared lamp strip 12 includes infrared lamp 122 arranged in the L-shaped groove 114 and a filter 121 is arranged in front of the infrared lamp 122. The groove 114 is arranged above the first cavity 113 in a thickness direction of the frame assembly 111, with an end surface of the frame assembly 111 in contact with the bottom cover 14 as a bottom surface.

The larger the size of the infrared touch product, the wider the corresponding frame assembly 111, and the larger the width d of the first cavity 113, so as to ensure the strength of the frame assembly 111, and immobilize the adapter 15 in both horizontal and vertical directions when the frame assemblies 111 in different directions are spliced. In addition, a thickness of the frame assembly 111 also needs to be adjusted with a thickness of the infrared touch product.

In actual use, the two frame assemblies 111 in different directions are spliced through respectively inserting the first connection member 151 and the second connection member 152 of the adapter 15 into the first cavities 113 of the two frame assemblies 111 in different directions. The two frame assemblies 111 in the same direction are spliced through respectively inserting a connection member into the first cavities 113 of the two frame assemblies 111 at both ends. The connection member may be a pin, a column and the like. The two frame assemblies 111 in the same direction may be spliced through locking, riveting and the like.

For a large-size integral frame, the segmented frame assemblies 111 at the same side may be fixed through the first cavity 113, while the frame assemblies at each corner need to be fixed in accordance with an actual splicing mode. The splicing method is the simplest and the most effective in conjunction with A in FIG. 2 and the unassembled structure in FIG. 4. In an actual splicing order, the filter 121 and infrared lamp 122 are inserted into the frame assemblies 111. Next, the frame assemblies 111 at different sides are spliced through the adapter 15. To be specific, the first connection member 151 is inserted into the first cavity 113, and then the frame assembly is fastened to the second connection member 152 through screwing a screw into a screw hole at a rear side of the frame assembly 111. The frame assemblies 111 at other sides are assembled in a similar way. After the entire frame has been assembled, it is assembled with the infrared touch display module 10 through the bottom cover 14. Through the above-mentioned structural design and the appropriate splicing mode, it is able to facilitate the manufacture and the assembling of the product.

In some cases, due to an increase in the width d of the first cavity 113, a second cavity 112 is further formed behind the groove 114 and above the first cavity 113 in the thickness direction of the frame assembly 111, with the end surface of the frame assembly 111 in contact with the bottom cover 114 as a bottom surface, so as to receive the connection lien 13. The second cavity 112 is arranged in parallel to the groove 114. In order to increase the structural stability of the frame assembly 111, reinforcement ribs or connection ribs are provided between the groove 114 and the second cavity 112, and between the second cavity 112 and the first cavity 113.

Figure 5A:
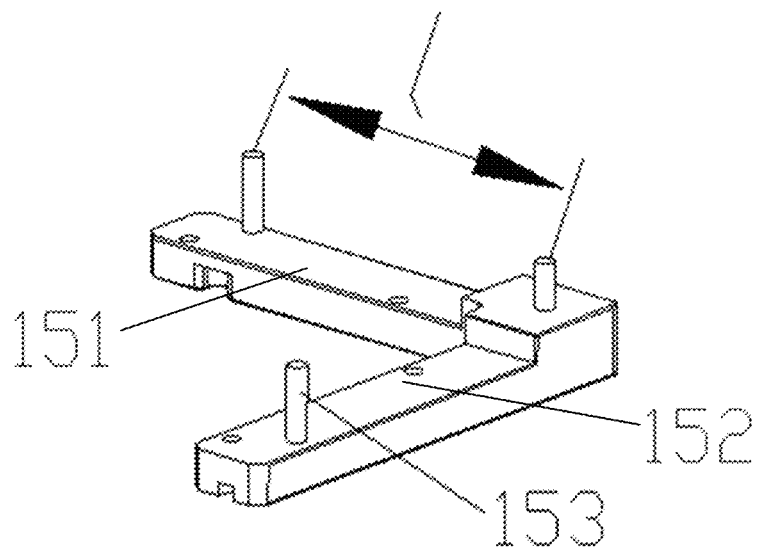
FIG. 5a is a schematic view of an adapter according to one embodiment of the present disclosure.

FIG. 5a shows the adapter. The first connection member 151 and the second connection member 152 are each provided with the bunching member 153, the connection line 13 for the infrared lamp strips 12 in the two frame assemblies 111 is bunched around the bunching members 153 when the frame assemblies 111 in different directions are spliced, so as to reduce a tensile force applied to the connection lien 13 during the assembling while reducing the cost as possible. In some cases, the bunching member 153 is also provided at a joint between the first connection member 151 and the second connection member 152, and the connection line 13 for the infrared lamp strip 12 is bunched around the three bunching members 153 when the frame assemblies 111 in different directions are spliced. In actual use, the bunching member 153 is a rotatable pin.

Figure 5B:
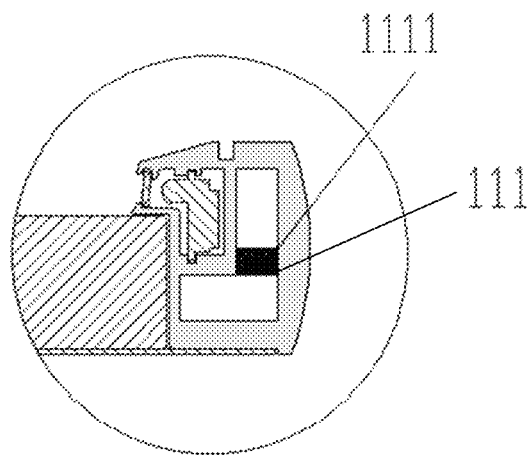
FIG. 5b is a schematic view of an internal structure of the frame assembly corresponding to the adapter according to one embodiment of the present disclosure.

FIG. 5b shows an internal structure of the frame assembly 111 corresponding to the adapter in FIG. 5a. In some cases, in order to allow the adapter 15 to be smoothly inserted into the frame assembly 111 when splicing the frame assemblies 111 in different directions, it is necessary to optimize the structures of the frame assemblies 111 in two different directions at the corner A. The first cavity 113 is in communication with the second cavity 112 at a side of the frame assembly 111 where the first connection member 151 or the second connection member 152 is inserted, so as to avoid a position of the bunching member 153 when the frame assemblies 111 in different directions are spliced through the adapter 15.

In actual use, a portion 1111 (the reinforcement rib/connection rib) between the first cavity 113 and the second cavity 112 of the two frame assemblies 111 at the corner A may be shortened by a certain length, so as to achieve the avoidance and enable the first cavity 113 to be in communication with the second cavity 112. The length is determined in accordance with a distance/between the two bunching members 153 in a same direction, so that a length of each of the two frame assemblies 111 at the corner in an extension direction of the corresponding first connection member 151 or second connection member 152 is smaller than or equal to an insertion depth/of the first connection member 151 or the second connection member 152. The first cavity 113 is in communication with the second cavity 112, so the bunching member 153 is capable of moving into an interior of the frame assembly along with insertion of the first connection member 151 or the second connection member 152.

Figure 6:
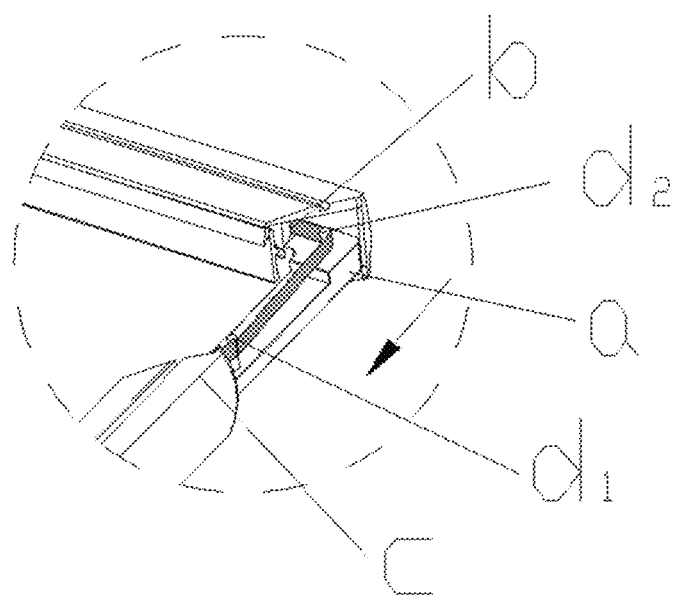
FIG. 6 is a schematic view showing an assembling order at a corner of the frame according to one embodiment of the present disclosure.

In the embodiments of the present disclosure, an assembling order at the corner is shown in FIG. 6, which includes the following steps. In Step a, the first connection member 151 of the adapter 15 is inserted into an upper frame assembly 111. In Step b, one end of the connection line 13 is inserted into the infrared lamp strip 12 in the upper frame assembly 111. In Step c, a right frame assembly 111 is moved close to the upper frame assembly 111, and the other end of the connection line 13 is inserted into the infrared lamp strip 12 in the right frame assembly 111. In Steps $d_1$ and $d_2$, the connection line 13 is bunched around the three bunching members 153. At this time, the right frame assembly 111 is moved upward, and the adapter 15 is inserted into the second cavity 112 together with the connection line 13, so as to bunch the line dynamically and orderly, thereby to facilitate the bunching.

Second Embodiment

The present disclosure provides in this embodiment a display device, which includes: the above-mentioned frame; the infrared touch display module 10; and the bottom cover 14 for packaging the frame and the infrared touch display module 10.

In actual use, the bottom cover 14 may also function as to splice the frame assemblies 111 of the frame.

In some cases, when the infrared touch product is an oversized product, there are multiple infrared touch display modules 10 which are spliced together. Then, the infrared touch display modules and the frame are packaged together through the bottom cover 14 to form the display device. The description about the frame may refer to that mentioned hereinabove, and thus will not be particularly defined herein.

Third Embodiment

The present disclosure provides in this embodiment a display apparatus including the above-mentioned display device.

In actual use, the display apparatus is an electronic whiteboard or a smart interactive tablet. The description about the display device may refer to that mentioned hereinabove, and thus will not be particularly defined herein.

In the embodiments of the present disclosure, such words as "longitudinal", "lateral", "on/above", "under/below", "front", "back", "left", "right", "vertical", "horizontal", "top", "bottom", "inside", and "outside" may be used to indicate directions or positions as viewed in the drawings, and they are merely used to facilitate the description in the present disclosure, rather than to indicate or imply that a device or member must be arranged or operated at a specific position.

It should be further appreciated that, the device and method may be implemented in any other ways. For example, the embodiments for the apparatus is merely for illustrative purposes, It should be further appreciated that, such word as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A frame for securing an infrared touch display module, comprising at least two frame assemblies, wherein the frame assemblies in different directions are spliced through an adapter, an infrared lamp strip is installed on the frame assembly, the adapter is provided with a bunching member, a connection line for the infrared lamp strip is bunched around the bunching member when the frame assemblies in different directions are spliced, and the bunching member is of a column-like structure.

2. The frame according to claim 1, wherein the adapter includes a first connection member and a second connection member coupled to the first connection member, each of the first connection member and the second connection member is provided with one bunching member, and the connection line for the infrared lamp strip is bunched around the two bunching members when the frame assemblies in different directions are spliced.

3. The frame according to claim 2, wherein one bunching member is arranged at a joint between the first connection member and the second connection member, and the connection line for the infrared lamp strip is bunched around the three bunching members when the frame assemblies in different directions are spliced.

4. The frame according to claim 1, wherein the bunching member is a pin.

5. The frame according to claim 2, wherein the frame assembly is provided with a groove for installing the infrared lamp strip and a first cavity for splicing the frame assemblies, wherein the groove is arranged above the first cavity in a thickness direction of the frame assembly, with an end surface of the frame assembly in contact with a bottom cover as a bottom surface.

6. The frame according to claim 5, wherein the two frame assemblies in different directions are spliced through inserting the first connection member and the second connection member into the first cavities of the two frame assemblies respectively.

7. The frame according to claim 5, wherein each frame assembly is further provided with a second cavity for receiving a connection line.

8. The frame according to claim 7, wherein the first cavity is in communication with the second cavity at a side of the frame assembly where the first connection member or the second connection member is inserted.

9. A display device, comprising:
the frame according to claim 1;
an infrared touch display module; and
a bottom cover for packaging the frame and the infrared touch display module.

10. The display device according to claim 9, wherein there is a plurality of infrared touch display modules spliced together.

11. A display apparatus, comprising the display device according to claim 9.

12. The display apparatus according to claim 11, wherein the display apparatus is an electronic whiteboard or a smart interactive tablet.

* * * * *